United States Patent [19]

Swiszcz

[11] Patent Number: 4,915,763

[45] Date of Patent: Apr. 10, 1990

[54] NON-WOVEN FABRIC, OPAQUE AND NON-OPAQUE, WITH AND WITHOUT WEAVE-LIKE FINISH AND PROCESS FOR PRODUCING THESE

[75] Inventor: Paul G. Swiszcz, Boulder, Colo.

[73] Assignee: Hunter Douglas Inc., Upper Saddle, N.J.

[21] Appl. No.: 236,071

[22] Filed: Aug. 24, 1988

[51] Int. Cl.$^4$ .............................................. B32B 31/00
[52] U.S. Cl. ................................... 156/209; 156/219; 156/220; 156/263; 156/290; 156/291; 427/271; 427/322; 427/385.5; 427/430.1
[58] Field of Search ............... 156/209, 219, 220, 263, 156/290, 291; 427/271, 322, 385.5, 430.1; 428/171, 172, 284, 296

[56] References Cited

U.S. PATENT DOCUMENTS 4,450,027  5/1984  Colson .................................. 156/193
4,810,556  3/1989  Kobayashi et al. .................. 428/296

Primary Examiner—James J. Bell
Attorney, Agent, or Firm—Pennie & Edmonds

[57] ABSTRACT

Non-woven fabrics produced from spunbonded web of the thermally bonded type suitable for use in folding window blinds are disclosed. To provide an opaque fabric with a weave-like finish a metalized blackout film and the spunbonded web substrate are laminated together while simultaneously embossing the substrate. Non-opaque fabrics may be made by using a film without metalization. Binder material is added to provide corrosion protection for the metalized film and additional bonding to the substrate. Difficulties in embossing this type of web are overcome by using steel embossing rollers and narrow widths of web. Using this basic process opaque fabrics may be made without embossing by creating a temporary bond between the layers with the surface tension of water, or non-opaque fabric made by not adding any film in the embossing step.

16 Claims, 3 Drawing Sheets

NON-WOVEN FABRIC, OPAQUE AND NON-OPAQUE, WITH AND WITHOUT WEAVE-LIKE FINISH AND PROCESS FOR PRODUCING THESE

BACKGROUND OF THE INVENTION

This invention relates to non-woven webs of polyester fibers and their processing. More particularly it relates to non-woven fabrics suitable for use in the manufacture of folding window blinds, such fabric being embossed to present a woven appearance and laminated with a metalized polyester film if opacity is required. The fabrics formed by this process are particularly suited for use in fabricating honeycomb insulating material as disclosed in U.S. Pat. No. 4,450,027, May 22, 1984 to Colson.

Such fabrics generally have been formed by embossing a woven pattern onto the surface of a spunbonded polyester substrate web. The substrate is saturated with a binder material to fill the interstices between the polyester fibers, completing the woven appearance and rendering the fabric impervious to adhesives used in latter fabrication steps. There are two types of spunbonded web which may be used to make this fabric: a binder bonded type and a thermally bonded type. The thermally bonded type is formed by extruding together two different polyester fibers, a highmelt and a lowmelt fiber. The web is then heated to the melting point of the lowmelt fibers which bond to the highmelt fibers, holding the web together. Embossing and adding binder may be done in later processing steps. In the binder bonded type only highmelt fibers are extruded onto a belt. The fibers are then embossed and subsequently saturated with a binder material which holds the fibers together to form the web.

The thermally bonded type of spunbonded polyester web exhibits discontinuities in thickness which repeat at least every four to five inches in both the lateral and longitudinal directions. These thickness discontinuities are resolved to some extent in the embossing process when the substrate is run through the embossing rollers under high temperature and pressure. However, in prior art methods the spunbonded web is generally processed in widths ranging from 30 to 180 inches, therefore the web is not embossed uniformly in the lateral direction because thick spots in the web prevent full pressure from being applied to adjacent thin spots. This problem has been alleviated to a degree by pairing the steel embossing roller with a resilient rubber roller to compensate for the lateral discontinuities. However, embossers using rubber rollers do not provide as high a quality emboss as do these with all steel rollers.

In prior art processes the application of a metalized polyester blackout film in order to make the fabric opaque required a number of separate steps that are time consuming and costly. The metalized polyester film is formed by vacuum metalizing a polyester film with an aluminum base material. This metalization corrodes easily and must be "topcoated" with a material to prevent corrosion. Topcoating generally is done with a thin, clear material layered over the metal. This thin, clear topcoat, however, is expensive and difficult to apply, adding significantly to the total cost of the material.

The metalized blackout film as prepared above is then bonded to the spunbonded substrate web in a separate process. Generally this bonding process involves the application of an adhesive to the substrate, drawing that adhesive through a drying tunnel, and then mating the substrate, with the sticky dried adhesive, to the film layer under heat and pressure.

Although the non-woven fabrics produced generally as described above are suitable for applications in the manufacture of folding window blinds they are costly to produce due to expensive materials and critical processing steps. It is therefore desirable to develop a non-woven fabric which would exhibit the same qualities of woven appearance and complete opacity while reducing the expense and difficulty of manufacture.

SUMMARY

Accordingly, the present invention provides an opaque non-woven fabric of a superior quality woven appearance in which the blackout film is bonded to the substrate without separate adhesives. The binder material used to finish the non-woven substrate also serves as the topcoat material for the metalized blackout film and as an additional bonding agent. This is accomplished by utilizing a narrow strip of the thermally bonded type of spunbonded polyester web as substrate material, the width of the web being less than the spacing of the lateral thickness discontinuities. In this manner the lateral discontinuities are eliminated and the embossing process must only compensate for longitudinal thickness discontinuities. This can be accomplished using steel embossing rollers which are resiliently mounted and apply a uniform pressure to the substrate thereby providing a superior quality appearance to the finished product.

In order to make the finished fabric opaque, a blackout film is bonded to the substrate. By using the thermally bonded substrate material which is composed of highmelt and lowmelt fibers, the blackout film may be thermally bonded to the substrate simultaneously with the embossing step or in a separate laminating step. The thermally bonded substrate is heated to a temperature sufficient to soften the lowmelt fibers and bond them to the blackout film under a low pressure.

The laminated fabric is then saturated with a binder material in an aqueous solution which is solidified by drying. The binder material completes the woven appearance of the non-woven substrate while at the same time providing an additional bond between the blackout film and substrate and serving as a protective topcoat for the metalized blackout film to prevent corrosion. The laminated fabric is then heated to cross-link the binder and flattened to eliminate wrinkles. After the cross-linking and flattening step the fabric is cooled in a flattened state.

DETAILED DESCRIPTION OF THE INVENTION

While the invention is described in connection with particular embodiments, it will be understood that it is not intended to limit the invention to these embodiments. On the contrary, it is intended to cover all alternatives, modifications and equivalents as may be included in the spirit and scope of the invention as defined by the claims.

Figure 1:
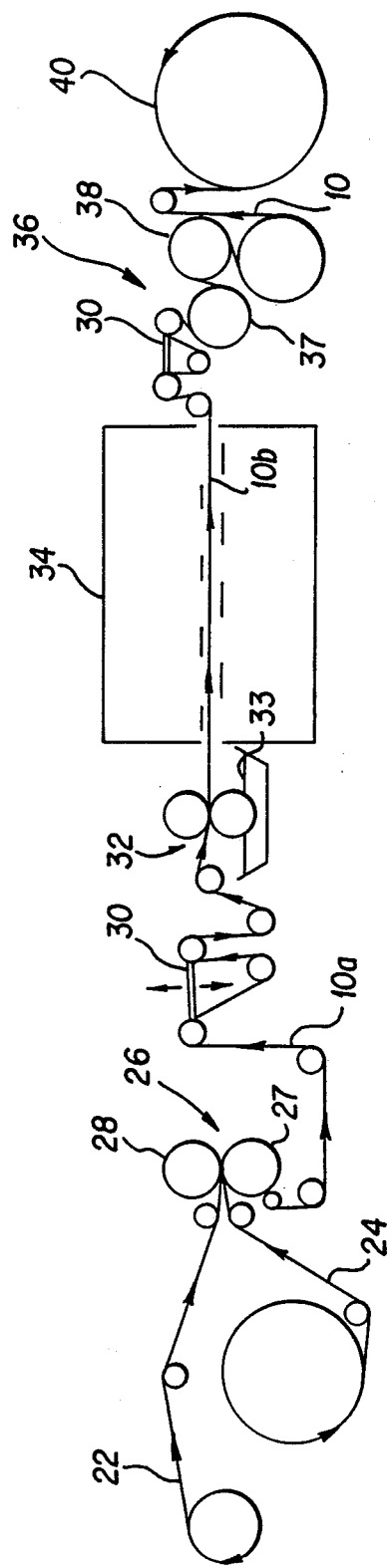
FIG. 1 is a schematic illustration of one embodiment of the process of the present invention.
Figure 2:
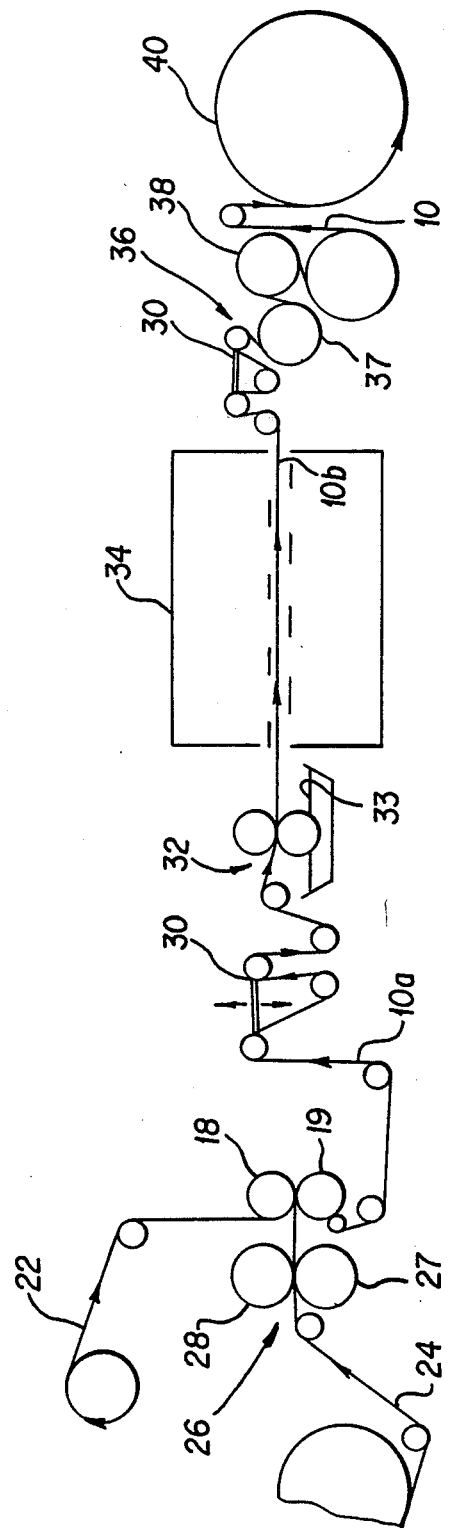
FIG. 2 is a schematic illustration of another embodiment of the process of the present invention.

Referring to FIGS. 1 and 2, a non-woven fabric with a weave-like finish is formed by laminating together a non-woven substrate 24 cut from a thermally bonded type of spunbonded web and a polyester film 22. To provide an opaque fabric as the finished product, the film 22 used is a metalized polyester film, vacuum metalized with an aluminum base material. Non-metalized films may be used to provide other desired characteristics, such as different colors or varying degrees of translucence. In the manufacture of window blinds polyester is the preferred material for the substrate web, depending on the particular application other thermally bonded types of webs, such as nylon or polypropylene may be used. Both the film and the web are products commercially available in the industry. The thermally bonded type of spunbonded polyester web is made up of highmelt and lowmelt fibers, the ratio of highmelt to lowmelt fibres is approximately 9 to 1. The lowmelt fibers of the substrate 24 melt at approximately 320° F., the highmelt at approximately 450° F.

The lamination step may be performed by the embosser 26 as in FIG. 1, or by separate laminating rollers 18, 19, as shown in FIG. 2. In the process as shown in FIG. 1, the two separate layers 22, 24 are pressed together between steel embossing rollers 27, 28 under high temperature and pressure. The embosser 26 simultaneously embosses a weave-like finish on the outside surface of the substrate 24. The steel rollers 27, 28 are heated to a temperature in the range of 350° F. to 400° F. causing the lowmelt fibers of the substrate 24 to soften and adhere to the blackout film 22 when it is applied to the substrate 24 under the pressure of the rollers 27, 28.

The pressure exerted by the steel embossing rollers 27, 28 is approximately 250 pounds per linear inch. The pressure should be sufficient to create the desired quality emboss, generally in the range of 100 to 400 pounds per linear inch. The steel rollers 27, 28 are four inches in width, with the substrate 24 and film 22 being approximately three and one-half (3½) inches in width. This relatively narrow width naturally eliminates lateral discontinuities in the thickness of the substrate 24 which occur in a repeating pattern at least every four to five inches across the width of spunbonded web. Similar discontinuities occur longitudinally in the substrate 24, but these do not prevent uniform embossing because the rollers 27, 28 are mounted resiliently to exert a constant pressure. The embossing rollers 27, 28 are mounted such that they may tilt or move apart relative to each other, while maintaining the set pressure. This aspect of the invention is discussed in more detail below, in conjunction with FIGS. 3 & 4.

The pressure required to emboss the substrate 24 greatly exceeds the pressure actually required to laminate the substrate 24 and film 22 together. When the metalized film is used the high embossing pressure can cause a distortion of the metalization layer resulting in a loss of complete opacity. To eliminate this problem, when a completely opaque fabric is desired the laminating step may be moved to just after the embossing step, as shown in the process of FIG. 2. The substrate 24 alone is run through the embosser 26 with the embossing occurring as described above, but the temperature may be reduced to around 300° F. The metalized polyester film 22 is then added by running the two layers together between the laminating rollers 18, 19. The laminating rollers 18, 19 are heated to a temperature in the range of 350° F. to 400° F. and the lamination occurs substantially as described above except that the pressure exerted by the laminating rollers 18, 19 is only about 25 pounds per linear inch.

After being laminated and embossed the substrate is saturated with a binder material 33 in an aqueous solution. The binder material 33, an elastomeric, acrylic latex emulsion, is applied in a padding bath 32. A tension-sensing dancer 30 controls the relative speeds of the embosser 26 and padding path 32 so there is not excessive or inadequate tension between the two devices.

In the padding bath 32 the binder material 33 is padded on to the substrate 24 of the laminated fabric 10a so that it is saturated through the substrate 24 and contacts the surface of the film 22. The binder material 33 performs a number of functions. It saturates and fills the interstices between the fibers of the substrate 24, adding to the finished weave-like appearance. The binder material 33 also serves as an additional bonding agent between the film 22 and substrate 24, and as a topcoat for the metalized blackout film to protect the metalized layer from corrosion.

After being saturated with the binder 33 the saturated fabric 10b is dried in an oven 34. A floater type oven is preferred so that the saturated fabric 10b may be dried without contacting a support surface. The temperature in the floater oven 34 is in the range of 250° F.–300° F., with the fabric exiting the oven at a temperature of about 150° F. The capacity of the oven 34 is the controlling factor as to the speed of the process. With an oven about thirty-six feet in length the process may be run at a speed in the range of 140 to 150 fpm in order to achieve satisfactory drying of the saturated fabric 10b. Doubling the oven length would generally allow a doubling of the process line speed.

The fabric 10b is finally cured and flattened in a heat-wheel device 36 which includes a second tension-sensing dancer 30 and two heat wheels 37, 38. The tension-sensing dancer 30 maintains the tension of the fabric 10b between the heat wheels 37, 38 and the padding bath 32. The heat wheels 37, 38 are maintained at a temperature of approximately 320° F., which raises the fabric to that temperature shortly after it contacts the heat wheels and thereby cross-links the binder material 33. The heat wheels 37, 38 also serve to flatten the fabric and eliminate wrinkles. After the completed fabric 10 is treated in the heat-wheel device 36 it is cooled on a cooling wheel 39 and then rolled on to a take-up drum 40.

Figure 3:
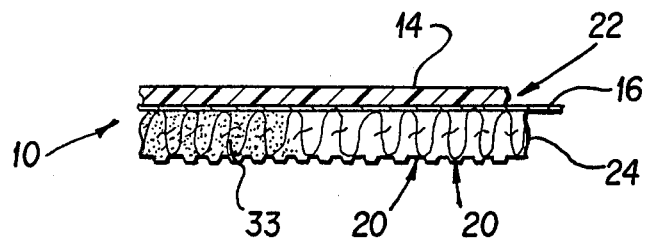
FIG. 3 is a cross section of the non-woven fabric of the present invention.

A cross-section of the opaque, non-woven fabric with a weave-like finish resulting from this process is shown in FIG. 3. The finished fabric 10 is made generally of two layers, the substrate 24 and the metalized blackout film 22. The substrate 24 has embossments 20 on its outside surface which provide a weave-like appearance. The binder material 33 is saturated through the substrate 24 to contact the laminated surface of the metalization 16 which is adhered to the polyester film 14 of the blackout film 22.

An inherent property of the spunbound web used as the substrate 24 for the non-woven fabric 10 is the presence of repeating patterns of thickness discontinuities in both lateral and longitudinal directions of the spunbonded web. The period of the repeating pattern is generally greater then four to five inches, in both directions. The thickness discontinuities arise due to uneven spreading of the fibers in the manufacture of the spunbonded web, causing areas of greater and lesser fiber concentration or density.

Steel embossing rollers generally provide a superior quality emboss, but the discontinuities prevent the steel rollers from applying a uniform emboss across a wide web because the rollers are held away from thin spots by the adjoining thick spots. In order to ensure that the substrate 24 is evenly embossed over its entire width, the spunbonded web of the present invention is precut to a width less than the period of the repeating discontinuities. The steel embossing rollers 27, 28 are resiliently mounted and apply a constant pressure. In this manner the rollers may follow the longitudinal contour of the substrate, providing a uniform emboss because there are no hills or valleys laterally, across the width of the substrate.

Figure 4:
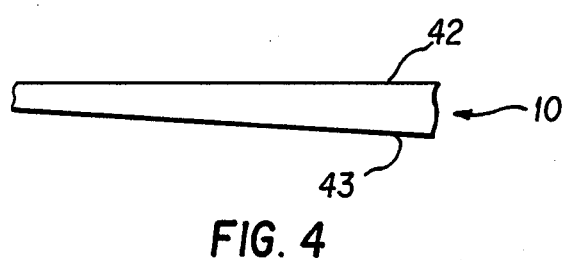
FIG. 4 is schematic representation of a cross-section of substrate after the embossing step of the process greatly exaggerated and separated from the blackout film.
Figure 5:
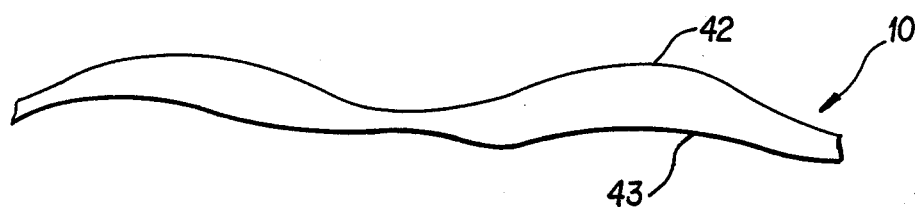
FIG. 5 is a schematic representation of a side view of the substrate after the embossing step of the process, greatly exaggerated and separated from the blackout film.

FIGS. 4 and 5 show the substrate 24 after it is embossed by this process. Because the rollers are resiliently mounted and may tilt, the top and bottom surfaces 42, 43 of the substrate are generally linear in the lateral direction as shown in FIG. 4. However, in the longitudinal direction the repeating thickness discontinuities are still present, but the orientation and resiliant mounting of the rollers 27, 28 allow them to follow this contour. The result is evenly embossed, but wavy top and bottom surfaces 42, 43 in the longitudinal direction as shown in FIG. 5. FIGS. 4 and 5 are greatly exaggerated to illustrate the process and the slight variations in thickness of the finished product are not perceivable without magnification.

With slight modifications to the basic process, variations on the opaque, non-woven fabric with a weave-like finish may be produced. The process may be used to produce a superior quality, non-opaque, non-woven fabric having a weave-like finish by simply running the process without adding a polyester film 22. The substrate 24 receives a superior quality emboss as described above and the binder material 33 fills the interstices to complete the appearance.

A second alternative product which may be produced using a variation of this basic process is an opaque, non-woven fabric which is not embossed at all. In this variation the process remains substantially the same as described previously except that the embosser 26, laminating rollers 18, 19 and first tension sensing dancer 30 are eliminated. The substrate 24 and metalized blackout film 22 are placed together in the padding bath 32 and are not embossed or thermally bonded. Instead, the surface tension of the aqueous binder material 33 which saturates through the substrate to contact the film provides a sufficient temporary bond to hold the layers together until the binder material 33 has been dried and solidified. The solidified binder material 33 then provides the permanent bond between the substrate 24 and blackout film 22. This variation may also be produced with a film that is not metalized.

What is claimed is:

1. A method for producing a non-woven fabric having a weave-like finish from a spunbonded substrate having lowmelt and highmelt fibers wherein the lowmelt fibers have a melting point lower than the melting point of the highmelt fibers, comprising the steps of:
    (a) embossing the substrate with a weave-like pattern;
    (b) subsequently saturating a binder material through the substrate; and
    (c) heating the fabric to dry and cure the binder material.
2. The method as in claim 1, further comprising the step of:
    (a) laminating the substrate together with a polyester film while simultaneously embossing the substrate.
3. The method as in claim 1, further comprising the step of:
    (a) laminating the substrate together with a polyester film, subsequent to the embossing step and prior to saturating with the binder material.
4. The method as in claim 2 or 3, wherein:
    (a) the film is thermally bonded to the substrate by softening lowmelt fibers during the laminating step which adhere to the film.
5. The method as in claim 4, wherein:
    (a) the film is a metalized polyester blackout film whereby the fabric produced by the method is opaque.
6. The method as in claim 1, wherein:
    (a) prior to the embossing step the substrate is precut from a non-woven web which is continuous in a longitudinal direction and has a definite width in a lateral direction, and has a repeating pattern of high and low fiber-density areas in both the lateral and longitudinal directions; and
    (b) the substrate is precut to a width which eliminates the repeating pattern of high and low fiber-density areas in the lateral direction.
7. The method as in claim 1, wherein:
    (a) the pressure in the embossing step is sufficient to produce a uniform weave-like appearance, between about 100–400 pounds per linear inch.
8. The method as in claim 3, wherein:
    (a) the pressure in the laminating step is sufficient to bond the film and substrate together, about 25 pounds per linear inch.
9. The method as in claim 2 or 3, wherein:
    (a) the temperature in the laminating step exceeds the melting point of the lowmelt fibers, between about 350° F.–400° F.
10. The method as in claim 1, wherein:
    (a) the embossing step is performed by two opposed steel rollers about 4 inches in width; and
    (b) the width of the substrate is about 3½ inches.
11. The method as in claim 2 or 3, wherein:
    (a) the width of the film substantially matches the substrate.
12. A method for producing a non-woven fabric from a spunbonded substrate having lowmelt and highmelt fibers wherein the lowmelt fibers have a melting point lower than the melting point of the highmelt fibers, comprising the steps of:
    (a) placing together a polyester film and the substrate while simultaneously saturating a binder material through the substrate, with the binder material forming a temporary bond between the film and substrate;

(b) heating the fabric to dry and cure the binder material, creating a permanent bond between the substrate and film.

13. The method as in claim 12, wherein:
(a) the polyester film is a metalized polyester blackout film whereby the fabric produced by the method is opaque.

14. The method as in claim 1 or 12, wherein the heating step includes the individual steps of:

(a) drying the fabric to solidify the binder material; and
(b) subsequently heating the fabric to cross-link the binder material.

15. The method as in claim 1 or 12, further comprising the step of:
(a) finally cooling the fabric in a flattened state.

16. The method as in claim 1 or 12, wherein:
(a) the substrate is selected from a group consisting of polyester, polypropylene and nylon.

* * * * *